United States Patent [19]

Tanguy

[11] 4,133,016
[45] Jan. 2, 1979

[54] APPARATUS DRIVEN BY AN ELECTRIC MOTOR AND INCORPORATING A SAFETY DEVICE

[75] Inventor: Pierre Tanguy, Dardilly, France
[73] Assignee: SEB S.A., Selongey, France
[21] Appl. No.: 826,549
[22] Filed: Aug. 22, 1977
[30] Foreign Application Priority Data
Sep. 14, 1976 [FR] France ............................. 76 27587
[51] Int. Cl.² ............................................. H02H 7/08
[52] U.S. Cl. ................................... 361/23; 200/61.07; 310/68 C; 241/33; 340/605
[58] Field of Search .............................. 361/1, 23, 178; 310/68 R, 68 B, 68 C, 68 E, 53; 340/242, 235; 200/61.04, 61.05, 61.06, 61.07, 85 R; 241/31, 46 A, 33, 46 B, 101.5, 285 A, 285 B, 257 G; 73/40, 46, 47, 49.2, 49.3

[56] References Cited
U.S. PATENT DOCUMENTS

| B 367,021 | 1/1975 | Howard et al. ..................... 340/242 |
| 1,272,308 | 7/1918 | Parker .............................. 200/61.04 |
| 3,979,569 | 9/1976 | Bilgrei ............................. 200/61.04 |

FOREIGN PATENT DOCUMENTS 2154982 5/1973 Fed. Rep. of Germany ............. 361/23

Primary Examiner—Patrick R. Salce
Attorney, Agent, or Firm—Young & Thompson

[57] ABSTRACT

An apparatus comprising a vessel adapted to receive a liquid, and which vessel has a drive shaft extending through the bottom of the vessel from an electric motor below the vessel to a rotary cutting or grinding blade or the like within the vessel, with a seal being provided to seal the vessel with respect to the drive shaft, has a safety device in the form of a cut-out switch which is normally held in its closed position by a plate of water-absorbent, cellulose-fibre based material disposed below the seal. Any aqueous liquid leaking from the seal will wet the plate reducing its strength and allowing the plate to bend to allow the cutout switch to move, under resilient bias to an open position, thus cutting off the supply of electrical current to the electric motor.

9 Claims, 12 Drawing Figures

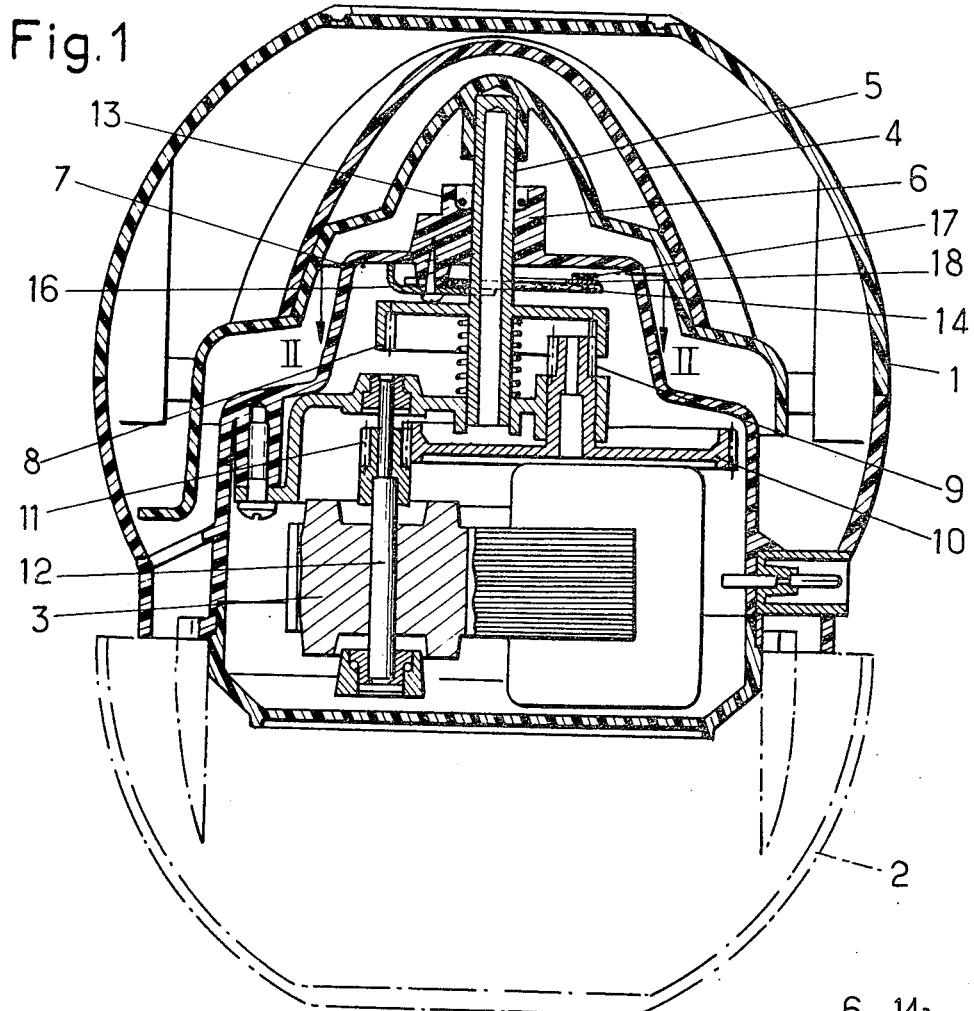
Fig.1
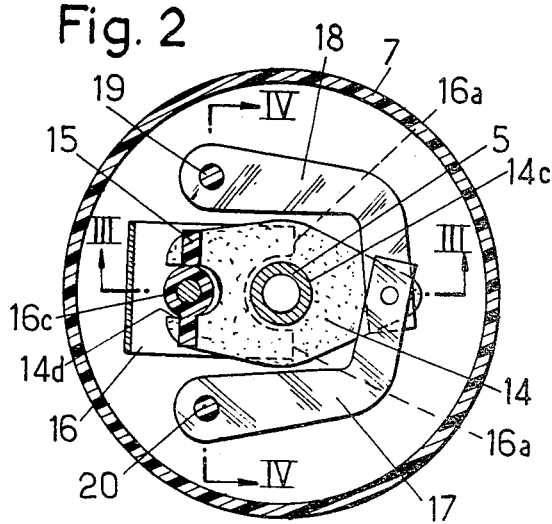
Fig. 2
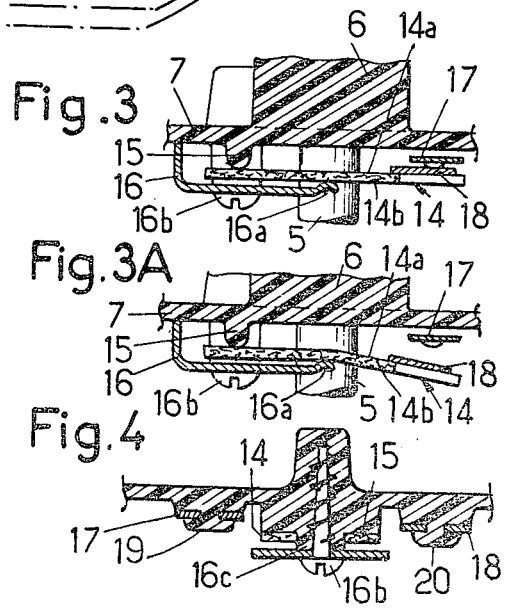
Fig. 3
Fig. 3A
Fig. 4

APPARATUS DRIVEN BY AN ELECTRIC MOTOR AND INCORPORATING A SAFETY DEVICE

This invention relates to an apparatus comprising a vessel which is adapted to receive a liquid and which has extending through it a drive shaft for driving a moving element, such as an agitator, stirrer, cutting or grinding blade or the like, movable in the vessel, the shaft being driven by an electric motor disposed below the apparatus and a seal being provided for sealing the vessel with respect to the shaft.

The invention is of particular utility in respect of domestic electric appliances, such as appliances for grinding foodstuffs in the presence of liquids, or such as clothes-drying and washing machines and dishwashers.

Domestic appliances for grinding foodstuffs in the presence of liquids, and domestic clothes-drying and washing machines and dishwashers, are known which comprise a liquid-receiving vessel through the bottom of which a drive shaft extends, through a seal or gasket in the bottom of the vessel, from an electric motor to a rotating element, such as grinding blades or a wash drum or wash paddle within the vessel. The motor and/or the electrical elements for controlling these facilities are usually disposed below the gasket.

Consequently, if the seal fails, the motor and/or the electrical elements just referred to may be wetted by liquid flowing through the now faulty seal, with the result that the motor and/or the electrical elements become damaged very rapidly.

It is an object of the invention to obviate this disadvantage by providing an effective and low-cost safety device adapted to interrupt operation of the motor if a leak or damage occurs at the seal between the drive shaft and the bottom or wall of the vessel.

According to the invention there is provided an apparatus comprising a vessel for receiving a liquid, an electric motor mounted below the vessel and a drive shaft extending into the vessel and in driving connection with the electric motor, the drive shaft being sealed with respect to the vessel by a seal around the drive shaft, the apparatus including electrical conductor means for conducting electrical current to the electric motor, a safety device being provided for interrupting energisation of the electric motor in the event of leakage of liquid past the seal, said safety device including a safety switch inserted in said electrical conductor means, means biasing said safety switch towards an open position, and means holding said safety switch in a closed position, the last mentioned means including a plate disposed outside said vessel below said seal, plate supporting means supporting and locating said seal with respect to said vessel, said plate acting as a beam transmitting from said plate supporting means to said safety switch the mechanical forces required to retain said safety switch in the closed position, said plate being made of a material which is relatively stiff when dry but which has its bending strength substantially reduced when wetted by said liquid, whereby in the event of a leak of said liquid from said seal, said plate will be wetted by said liquid and will consequently be weakened and will bend to allow said switch to move to its open position thereby interrupting the supply of current to said motor via said conductor means.

By bending when it has been impregnated with a liquid, inter alia water, this simple plate is a means of ensuring an effective cut-off of energization of the motor in the event of a leak at the seal, and so the motor and other electrical elements disposed near the seal run no risk of being damaged by the liquid or water in the vessel. The electrical energization cannot be restored without replacement of the plate. After repair or replacement of the faulty seal, however, it is a simple matter to restore the apparatus to an operative state by replacing the wetted plate with a new plate.

Advantageously, the plate is substantially perpendicular to the axis of the drive shaft and extends on both sides thereof.

This feature helps to ensure that the plate receives any liquid discharging through the seal above the plate should this seal be faulty.

Preferably, the drive shaft extends through a circular aperture in the plate and the diameter of this aperture corresponds substantially to that of the drive shaft. This ensures that liquid leaking from the seal cannot pass between the plate and the drive shaft without wetting the plate sufficiently. Consequently, substantially all the liquid discharging from the seal, should this be faulty, is absorbed by the plate, and so the same plate bends very rapidly in the event of a failure and cuts off energization of the motor.

Preferably, the plate consists of a cellulose fibre based material such as unwaterproofed board. A feature of this material is that it is relatively stiff when dry, but softens when impregnated with water, so that its bending strength decreases. Another advantage of such board is that it is very cheap.

Other features and advantages of the invention will become apparent from the following description with reference to the drawings, given by way of example only.

In the drawings

FIG. 1 is a view in longitudinal section of an appliance for extracting the juice from citrous fruit, the appliance having a safety device according to the invention;

FIG. 2 is a section on the line II—II of FIG. 1;

FIG. 3 is a view in longitudinal section to an enlarged scale of the part of the appliance of FIG. 1 incorporating the safety device;

FIG. 3A is a view similar to FIG. 3 showing the operation of the safety device;

FIG. 4 is a section on the line IV—IV of FIG. 2;

Figure 5:
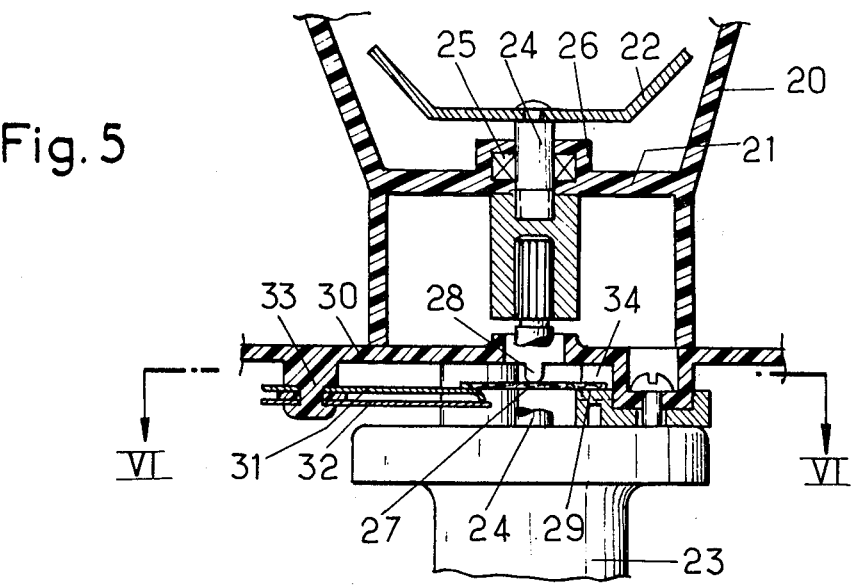
FIG. 5 is a view in partial longitudinal section of a domestic electric mixer and pulverizer or liquidizer having a different form of safety device.

Referring to FIG. 1, an appliance for extracting juice from citrous fruits comprises a pulp receptacle 1, a juice collector 2 and an electric motor 3 for rotating a ribbed pulping cone 4. The cone drive shaft 5 is mounted for rotation in a bearing 6 disposed in a wall 7 which separates the vessel 1 from the motor 3. The drive shaft 5 has a crown gear 8 meshing with gears 9, 10 and 11 forming a gear train driven by a shaft 12 of an electric motor 3.

Also, the bearing 6 has a seal or gasket or the like 13 to keep liquid out of the bearing 6 and away from the motor 3.

As can be seen in FIGS. 1 to 3, a device for interrupting operation of the motor 3 in the event of leaks occurring at the seal 13 comprises a plate 14 disposed below the seal 13 substantially perpendicularly to the shaft 5. The plate 14 is made of a material which is relatively rigid when dry and whose bending strength decreases when it is impregnated by an aqueous liquid.

In the example shown the plate 14 is made of waterproofed board of a thickness of from 0.5 to 1 mm. This cellulose fibre based material can absorb water and softens when steeped in water.

Also, and as can be seen particularly clearly in FIG. 3, the plate 14 is retained between first and second abutment means, the first abutment means being in the form of a projecting shoulder 15 of wall 7 and the second abutment means being in the form of the two ends 16a of a bifurcated end part of a small metal plate 16 secured to wall 7 by a screw 16b. Plate ends 16a and shoulder 15 engage opposite faces of the plate 14, the ends 16a being in contact with one face 14b of plate 14 intermediate two opposite ends of the plate 14, the two ends 16a engaging the plate at positions diametrically opposed with respect to the shaft 5. The shoulder 15 engages with the other face 14a of the plate substantially at one of said two opposite ends thereof.

Also, and as can be seen more particularly in FIG. 3, an electric switch in the form of two electrically conductive strips 17, 18 in contact with one another bears on plate surface 14a at that end of the plate remote from the end engaged by the shoulder 15. The two strips 17, 18 are connected to conductors (not shown) connected to the motor 3 and to the power supply. The upper metal strip 17 is substantially rigid and the bottom strip 18 is resiliently flexible and is so tensioned as to spring away from the top strip 17 to disengage therefrom when allowed to do so by the plate 14 weakening and thus bending about end 16a.

Also, as can be gathered from FIG. 4, the strips 17, 18 are secured to protuberances 19, 20 from the underside of wall 7 by hot riveting of the plastics of which the protuberances 19, 20 are made.

Also, as can be seen in FIG. 2, the drive shaft 5 extends through the plate 14 and the same is accordingly formed with a circular aperture 14c of substantially the same diameter as the diameter of the shaft 5.

The plate 14 is located angularly by means of a recess 14d in that end of the plate 14 which is remote from the strips 17 and 18, the edges of the recess 14d engaging below the shoulder 15 and being disposed one on either side of a protuberance 16c.

The device according to the invention operates as follows:

If the seal 13 starts to leak or is damaged, the aqueous juice in the vessel 1 leaks along the drive shaft 5 and spreads over the surface of the plate 14. In a first phase the plate 14 keeps the juice away from the motor 3.

The liquid is then absorbed by the board plate 14, the same consequently softening. The bending strength of the plate 13 therefore becomes insufficient to keep the contact strips 17, 18 in contact with one another, with the result that the plate 14 bends, as shown in FIG. 3A, as a result of the flexible strip 18 bearing on it, the strips 17 and 18 therefore disengaging from one another and thus cutting off the power supply to the motor 3. There is therefore no risk of the motor 3 being damaged by the liquid leaking through the bearing 6.

Experience has shown that the board plate 14 will respond to a very small amount of water, since it starts to bend before the board of which the plate 14 is made is completely saturated and before the liquid overflows at the periphery of the plate 14. Also, since the aperture 14c in the plate 14 is of the same diameter as the shaft 5, there is no risk of significant leakage between the shafts and the plate 14.

Experiments have also shown that a conventional unwaterproofed board plate of a thickness of from 0.5 to 1 mm and measuring approximately from 0.5 to 5 cm was rigid enough when dry to keep the strips 17, 18 in contact with one another at adequate pressure and ensure that they did not separate from one another as a result of mechanical impacts or of vibrations applied to the apparatus.

The bending of the board 14 is irreversible, and so if the seal 13 is damaged the plate 14 must be replaced by a new plate. The replacement can be carried out very readily. First, the drive shaft 5 is demounted, then the plate 14 is engaged between shoulder 15 and plate 16, then the drive shaft 5 is introduced into aperture 14c of plate 14.

Figure 6:
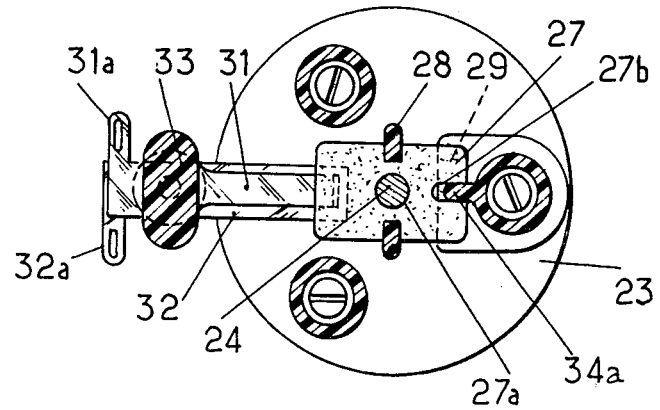
FIG. 6 is a section on the line VI—VI of FIG. 5.

In the embodiment shown in FIGS. 5 and 6, the mixer and pulper comprises a pulping vessel 20 having rotatably mounted therein, adjacent its bottom 21 a set of pulping or crushing blades 22 driven by a motor 23 via a shaft 24 which extends vertically through the bottom 21, through a seal 25 around the shaft 24. A non-waterproofed board plate 27 is disposed below seal 25 of bearing 26 and is perpendicular to the axis of shaft 24. Plate 27 is received between two abutment means 28, 29 engaging opposite faces of the plate 27 and rigidly secured to a wall 30 of the apparatus.

Abutment means 28 which engages the plate at a position midway between two opposite ends thereof, takes the form of two ribs on the underside of the wall 30 and the ribs being diametrically aligned with each other on opposite sides of the hole in wall 30 through which shaft 24 passes and extends substantially centrally of the plate 27. The other abutment means, 29, engages the underside of the plate 27 at one of said two opposite ends, the abutment means 24 being in the form of a shoulder which co-operates with the wall 30 to bound a recess 34.

The other of said two opposite ends of the plate 27 is engaged, on the underside of the plate, by the upper contact strip 31 of two contact strips 31, 32 which together form a safety switch.

As can be seen in FIG. 6, the plate 27 is also formed with a central circular aperture 27a of substantially the same diameter as the shaft 24 extending through it.

The top contact strip 31 is resiliently flexible and is so prestressed as to tend to spring upwardly and the bottom strip 32 is relatively rigid. The strips 31, 32 are rigidly secured to the wall 30 by way of a protuberance 33 and are provided with tags or the like 31a, 32a adapted to be soldered to wiring connected to the motor 23 and to a power supply.

The plate 27 is located by its central aperture 27a and by a recess 27b which receives a rib 34a parallel to the shaft 24 and secured to the wall 30.

Figure 5A:
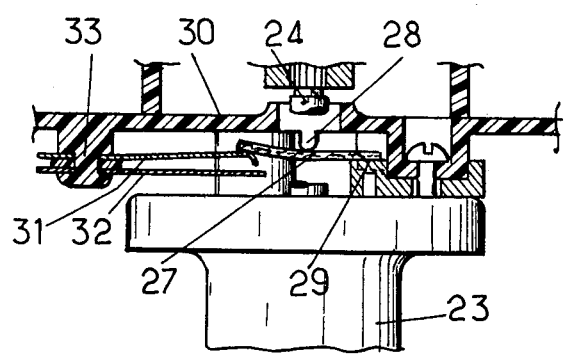
FIG. 5A is a detail view of the safety device of the apparatus of FIG. 5 and shows the operation thereof.

Should a leak occur at the seal 25, the leaking liquid spreads over the plate 27 and impregnates it so that it softens. The strip 31 causes the plate 27 to bend, with the result that the strip 31 moves away from the strip 32, in the manner visible in FIG. 5A, to interrupt the energization of the motor 23. Damage to the motor is therefore obviated.

Figure 7:
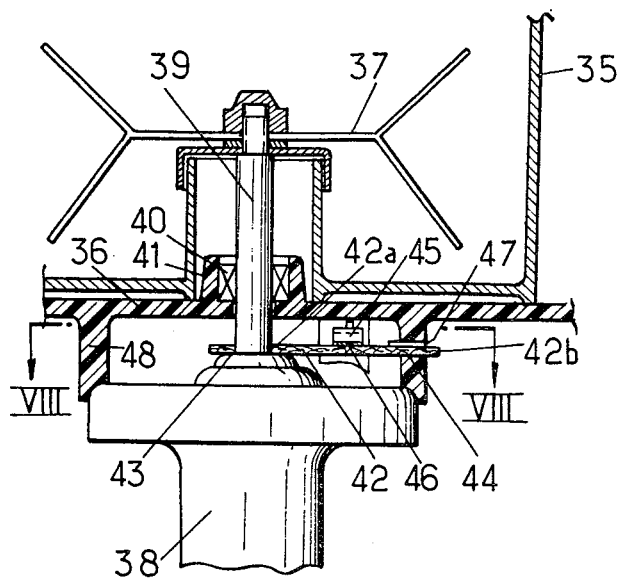
FIG. 7 is a view in partial longitudinal section of a domestic electric pulverizer or liquidizer having another form of safety device according to the invention.
Figure 8:
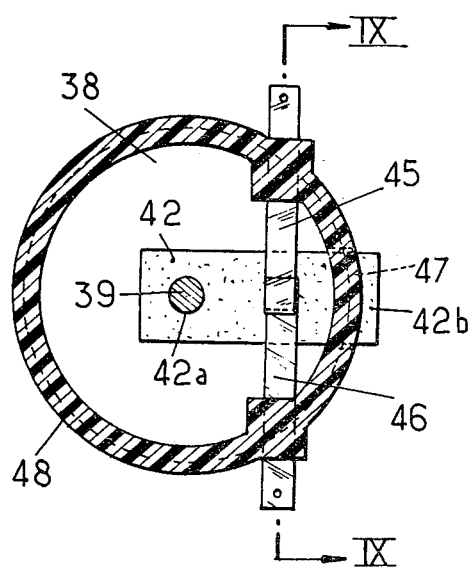
FIG. 8 is a section on the line VIII—VIII of FIG. 7.
Figure 9:
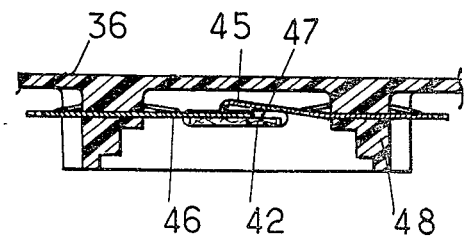
FIG. 9 is a section on the line IX—IX of FIG. 8.

In the embodiment shown in FIGS. 7 to 9, the liquidizer comprises, as in the previous embodiment, a liquidizer vessel 35 having rotatably mounted therein, adjacent its base 36, a set of liquidizing blades 37 driven by an electric motor 38 via a drive shaft 39 rotatably mounted in a bearing 41 in the base 36 and sealed with respect to the vessel by a seal 40. A plate 42 of cellulosic fibre board, of a thickness of from about 0.5 to 1 mm is disposed below seal 40 of bearing 41 and is perpendicular to the axis of shaft 39.

The two opposite ends of plate 42 rest upon bearing surfaces 43, 44 rigidly secured to motor 38 and to base 36. Contact strips 45, 46 connected to conductors (not shown) bear upon the upper face of the plate 42 between its two ends.

Plate 42 is located by a circular aperture 42a of substantially the same diameter as the shaft 39 which passes through the aperture 42a, and by a recess 47 in a ring 48 rigidly secured to wall 36, end 42b of plate 42 engaging in recess 47.

A safety switch is formed by two strips 45, 46 which extend towards each other from parts of the ring 48 on opposite sides of the plate 42, the end of the strip 45 overlapping the end of the strip 46.

Figure 7A:
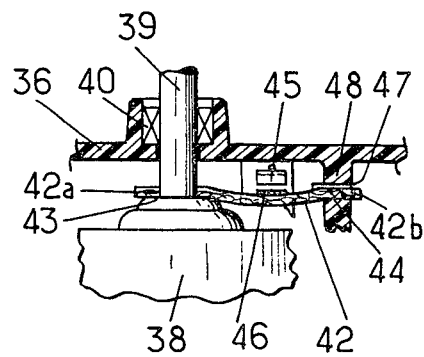
FIG. 7A is a detail view showing the operation of the safety device of the apparatus of FIG. 7.

In the event of a leak through the seal 40, the leaking liquid spreads over the surface of plate 42 and impregnates the board of which it is made. The resultant softening of the board allows the plate 42 to bend, in the manner visible in FIG. 7A, response to the force exerted by the prestressed lower strip 46 with the result that the strip 46 separates from the relatively rigid strip 45 and thus cuts off the power supply to the motor 38.

The invention is not of course limited to the examples described, to which many variations can be made without departing from the scope of the invention.

For instance, the device according to the invention is of use in any appliance in which a leakage of water or aqueous liquid may damage a motor placed below the tank holding the liquid.

Also, the board of which the plates 14, 27, 42 are made can be replaced by any other material which is rigid enough when dry and whose bending strength decreases appreciably as a result of contact with water. This is the case with fibre-based materials and with products which soften or at least partly dissolve as a result of contact with water.

I claim:

1. In an apparatus comprising a vessel for receiving a liquid, an electric motor, means mounting the electric motor below the vessel, a drive shaft extending into the vessel and in driving connection with said electric motor, a seal around said drive shaft for sealing the vessel with respect to said drive shaft and electrical conductor means for conducting electrical current to said electric motor, the improvement comprising a safety device for interrupting energization of the electric motor in the event of leakage of said liquid past said seal, said safety device including a safety switch inserted in said electrical conductor means, means biasing said safety switch towards an open position, and means holding said safety switch in a closed position, the last mentioned means including a plate disposed outside said vessel below said seal, plate supporting means supporting and locating said seal with respect to said vessel, said plate acting as a beam transmitting from said plate supporting means to said safety switch the mechanical forces required to retain said safety switch in the closed position, said plate being made of a material which is relatively stiff when dry but which has its bending strength substantially reduced when wetted by said liquid, whereby in the event of a leak of said liquid from said seal, said plate will be wetted by said liquid and will consequently be weakened and will bend to allow said switch to move to its open position thereby interrupting the supply of current to said motor via said conductor means.

2. The apparatus of claim 1 wherein said plate is substantially perpendicular to the axis of said drive shaft and extends on both sides of said drive shaft.

3. The apparatus of claim 2 wherein said plate engages said safety switch, at one end of said plate, and said switch bears against one face of said plate, and wherein said plate supporting means comprises first abutment means bearing against said one face of the plate at the opposite end thereof and second abutment means bearing against the other face of said plate at a position intermediate the ends thereof.

4. The apparatus of claim 2 wherein said plate engages said safety switch at a position intermediate opposite ends of said plate, said switch bearing against one face of said plate, and said plate supporting means includes first abutment means engaging the other face of said plate at one of said opposite ends of the plate and second abutment means engaging said other face of said plate at the other of said opposite ends of the plate.

5. The apparatus of claim 1 wherein said plate is formed with a circular aperture therethrough and said drive shaft extends through said circular hole, the diameter of said circular aperture corresponding substantially to the diameter of the drive shaft.

6. The apparatus of claim 1 wherein said safety switch comprises a first and a second electrically conductive strip, which make electrical contact with each other in the closed position of the switch, said second electrically conductive strip being resiliently flexible and said first electrically conductive strip being substantially stiffer than said second strip, said second strip being disposed between said first strip and said plate and being held in contact with said first strip in the closed position of the switch, said means biasing the switch to its open position being the inherent tensioning of said second strip in the closed position of the switch, whereby said second strip will spring away from the first strip when the retaining force provided by said plate is removed.

7. The apparatus of claim 1 wherein said plate is made of water absorbent cellulose fibre based material and has its bending strength substantially reduced when wetted by water.

8. The apparatus of claim 7 wherein said plate is made of unwaterproofed board.

9. The apparatus of claim 8 wherein said plate has a thickness of between 0.5 and 1 mm.

* * * * *